United States Patent [19]
Gossler et al.

[11] Patent Number: 5,514,923
[45] Date of Patent: May 7, 1996

[54] HIGH EFFICIENCY DC MOTOR WITH GENERATOR AND FLYWHEEL CHARACTERISTICS

[76] Inventors: Scott E. Gossler, 2331 Palermo Dr., San Diego, Calif. 92106; Eugene R. Murray, 6521 Lochmoor Dr., San Diego, Calif. 92120

[21] Appl. No.: 127,471

[22] Filed: Sep. 28, 1993

Related U.S. Application Data

[63] Continuation-in-part of Ser. No. 518,752, May 3, 1990, abandoned.

[51] Int. Cl.⁶ .............................. H02K 37/00; H02J 7/00; H02P 7/20
[52] U.S. Cl. .................. 310/74; 310/68 B; 310/113; 310/156
[58] Field of Search ................................ 310/68 R, 68 B, 310/68 C, 68 D, 74, 152, 153, 156, 184, 185, 259, 268, 266, 113, 114

[56] References Cited

U.S. PATENT DOCUMENTS

| | | | |
|---|---|---|---|
| 3,890,548 | 6/1975 | Gray | 318/139 |
| 3,974,817 | 8/1976 | Henderson et al. | 123/149 C |
| 4,055,789 | 10/1977 | Lasater | 320/6 |
| 4,146,806 | 3/1979 | Katsumata | 310/153 |
| 4,182,967 | 1/1980 | Jordan | 310/74 |
| 4,237,410 | 12/1980 | Erickson et al. | 320/14 |
| 4,330,742 | 5/1982 | Reimers | 320/14 |
| 4,486,675 | 12/1984 | Albert | 310/46 |
| 4,629,947 | 12/1986 | Hammerslag et al. | 318/161 |
| 4,785,228 | 11/1988 | Goddard | 322/29 |
| 5,258,697 | 11/1993 | Ford et al. | 318/498 |

*Primary Examiner*—Steven L. Stephan
*Assistant Examiner*—D. R. Haszko

[57] ABSTRACT

A high efficiency multi-phasic type DC motor incorporating brushless electronic switching to phase the attractive and repulsive forces between the permanent magnets in the rotor and wire wound air core coils in the stator. The unequal number of magnets and coils provides a designed imbalance, so that proper energization induces rotation and torque in the motor's dual flywheel rotor. Electronic switching collects inductive kickback and back emf simultaneously during the motor phase and in addition, disconnects the attraction and repulsion phases during regenerative braking, etc. and directs all this generated power back to the power pack where it is stored in batteries and capacitors. The rechargeable batteries and capacitors in the power pack are the source of operating electrical power for the motor. The rotating assembly is designed to have adequate mass so that the kinetic energy of rotation smooths out the pulsing moments introduced by the attraction and repulsion of the coils and magnets and to ensure continuous rotation of the dual flywheel rotor. The combination of electronic switching, the low hysteresis loss in the air core coils, the streamlined configuration of the rotor which reduces windage loss and the recovery of the generated currents in the air core coils contribute to the high efficiency of the electric DC motor.

5 Claims, 3 Drawing Sheets

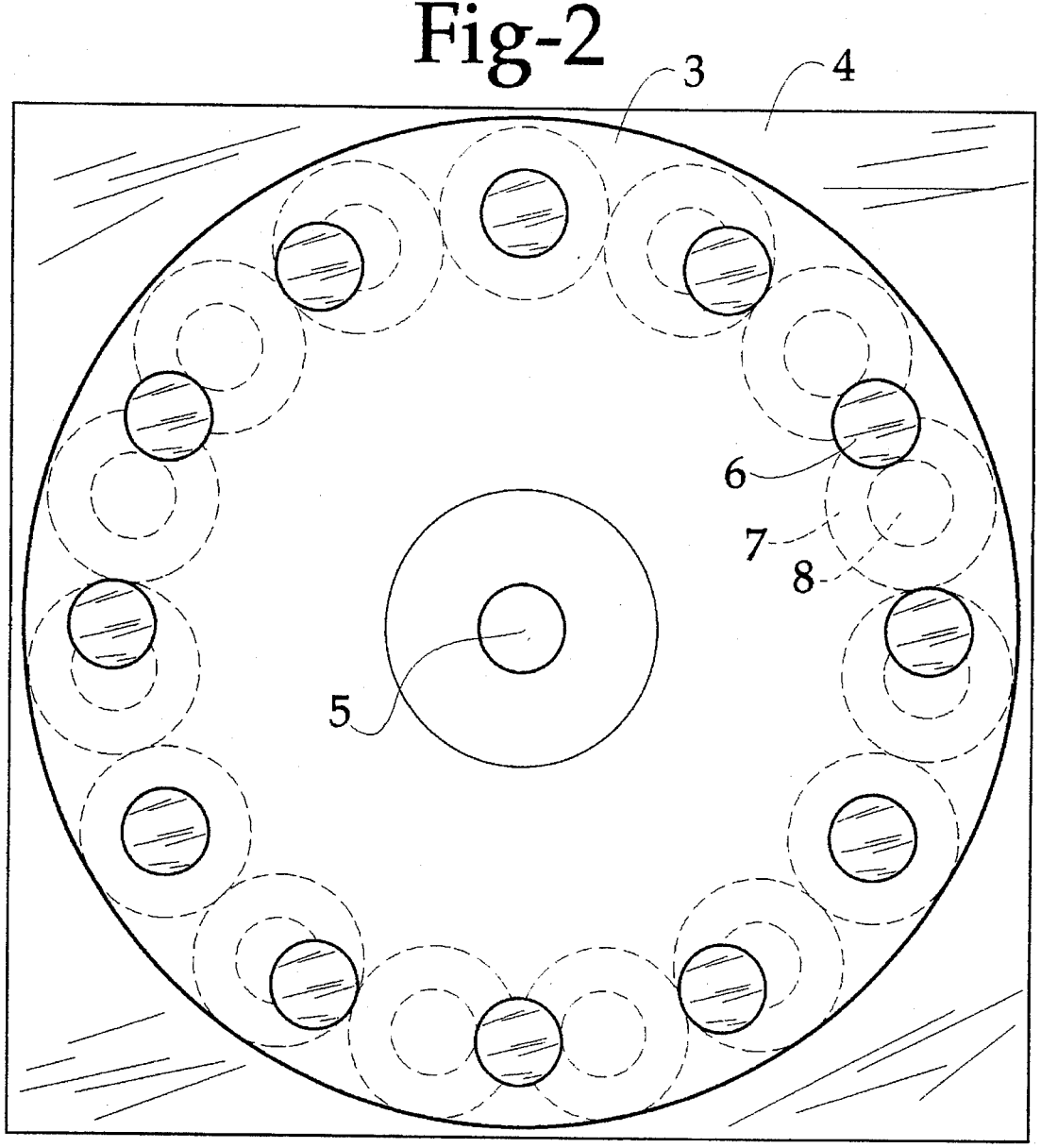

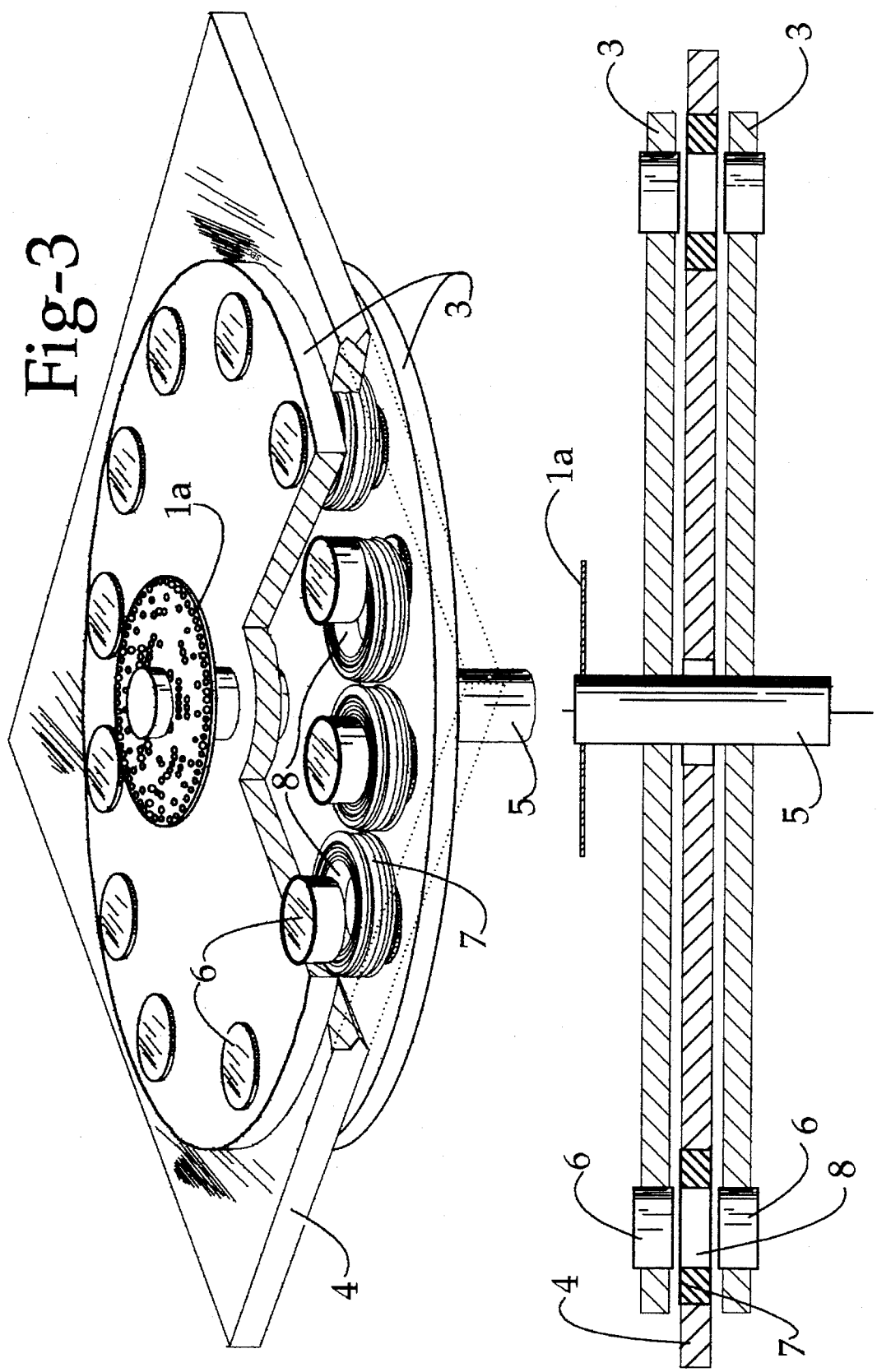

HIGH EFFICIENCY DC MOTOR WITH GENERATOR AND FLYWHEEL CHARACTERISTICS

This is a Continuation in Part of U.S. patent application Ser. No. 07/518,752 filed May 3, 1990, now abandoned

BACKGROUND OF THE INVENTION

1. Field of the Invention

This invention is concerned with a high efficiency multi-phasic DC motor with rotor flywheel that operates with generator characteristics that simultaneously captures and stores inductive kickback and back emf, in addition to collecting generated power such as regenerative braking. The motor has an efficiency of about 80% at 100 RPM rising to 95% at 3000 RPM. It is pancake shaped with sufficient mass in the dual rotors to store kinetic energy as a flywheel. Twelve (12) permanent magnets are mounted in the periphery of the dual rotors and fifteen (15) air core coils in the periphery of the stator which is a designed imbalance, that positions adjoining magnets at different degrees of distance from coils ahead and coils behind. The inductive kickback, back emf and other generated power are stored for future use in a power pack of rechargeable batteries and capacitor banks. Torque and RPM are controlled and varied by a microprocessor and algorithm.

2. Description of the Related Art

A. U.S. Pat. No. 4,330,742 to Reimers May 18, 1982 "Circuitry for Recovering Electrical Energy with an Electric Vehicle DC Propulsion Motor When Braking" describes a DC propulsion motor for a vehicle that becomes a generator by using the motor's kinetic energy when the vehicle is braked. U.S. Pat. No. 4,055,789 to Lasater Oct. 25, 1977 for "Battery Operated Motor With Back EMF Charging" describes a motor driven by electric current from a charged battery during a first time interval. During a second time interval the charged battery is disconnected and a discharged battery is connected to the motor, which is operating as a generator as it winds down. U.S. Pat. No. 3,890,548 to Gray Jun. 17, 1975 for a "Pulsed Capacitor Discharge Electric Engine" describes a motor that uses stepped-up transformer current from batteries to charge capacitors, which are discharged across a spark gap through stator and rotor coils, generating motion by magnet repulsion. The discharge overshoot (inductive kickback) from collapsing fields in the coils is then used to energize (charge) external batteries for conservation of power. U.S. Pat. No. 4,785,228 to Goddard Nov. 15, 1988 "Electrical Energy Enhancement Apparatus" describes a generator device driven by an externally operated motor that uses a flywheel and gyroscope in the motor to store energy. U.S. Pat. No. 4,629,947 to Hammerslag et al Dec. 16, 1986 "Electric Vehicle Drive System" describes an electric vehicle power system that uses a battery to drive electric drive motors, a flywheel to drive a generator during peak loads and a microprocessor to control the system, with the battery and flywheel recharged during deceleration or braking, or by a charger when idle.

DC motors that individually capture, collect, store and use all forms of generated power, inductive kickback, back emf and regenerative braking, etc. are not described in prior art DC motors.

B. U.S. Pat. No. 4,438,362 to Brown Mar. 20, 1984 "Self Starting DC Motor with Permanent Magnets of Varied Magnetic Strength" describes a disk shaped motor with annular magnets in the periphery and a coil in the center with all magnets reacting together as the coil is energized and de-energized. U.S. Pat. No. 4,551,645 to Takahashi, et al Nov. 5, 1985 for "Disk Type Brushless Motor" describes a motor with field magnets of two or more poles and loop-like armature windings in quantities of two or more. It is concerned with not overlapping the armature windings. U.S. Pat. No. 4,707,645 to Miyao et al Nov. 17, 1987 for "Single Phase Brushless Motor" describes a motor, with dual rotors that has six magnets and three non-magnets on the peripheries of the rotors, and a stator with nine coils on it's periphery, providing perfect balance between the nine magnets and non-magnets and the nine coils so that all magnets pass over a coil at exactly the same time in perfect balance.

A designed imbalance in the number of magnets and coils which positions adjoining magnets at different degrees of distance from coils ahead and coils behind, and which insures that all magnets do not pass over a coil at exactly the same time is not described in prior art DC motors.

C. U.S. Pat. No. 4,394,594 to Schmider, et al Jul. 19, 1983 for "Motor With a Disk Rotor " describes two groups of "iron-free coils" that are press mounted to the metal casing of the stator, (with insulating foil). However, the conductive metal casing is still subject to hysteresis and eddy currents which are electromagnetically induced when the "iron-free coils" are energized, during operation of the "Motor With a Disk Rotor", unlike the said air core coils of the instant invention that utilizes cores of non-conductive non-magnetic material. Also, if a north pole is induced in the Schmider "iron-free coils" with the same current as required in the said air core coils, the "iron-free coils" will not repel the north poles of strong permanent magnets as efficiently as the said air core coils in the applicants invention. Instead strong neodymium magnets will actually attract any conductive metal casing attached to the "iron-free coils" unless more power is added (inefficiently) to the "iron-free coils".

Air core coils with cores that are non-conductive or non-magnetic, or coils that are not attached to conductive or magnetic materials, were not described in prior art DC motors.

D. U.S. Pat. No. 4,237,410 to Erickson et al, Dec. 2, 1980 "Regenerative Electric Motor" describes a brush type DC motor that uses the voltage from collapsing electromagnetic fields around the armature (inductive kickback) to charge the batteries. And U.S. Pat. No. 4,055,789 to Lasater Oct. 25, 1977 for "Battery Operated Motor Switch Back EMF" describes the use of inductive kickback to charge the batteries. U.S. Pat. No. 4,785,228 to Goddard Nov. 15, 1988 "Electrical Energy Enhancement Apparatus" describes an apparatus that uses capacitors connected to electromagnets as alternate power sources. As resonance occurs in the energy flow between the capacitors and electromagnets, energy fed back from the electromagnets assists in driving the apparatus. Pat. No. 3,890,548 to Gray Jun. 17, 1975 "Pulsed Capacitor Discharge Engine" describes a motor that uses storage batteries and a capacitor bank. The batteries charge the capacitor bank, which discharge through oppositely polled coils to drive (repel) the rotor. Secondary batteries are charged by inductive kickback and with the primary batteries appear to be the power source for the "engine".

However, the directing of power through the coils to both pull and push the permanent magnets in the rotors in the same direction is not described in prior art DC motors.

E. The applicant's DC motor is multi-phasic as 1) it is designed and built with (t) (an integer equal to 2 or greater) multiple phases and 2) while operating it can utilize one or more of the multiple phases, depending on the load requirements, and as directed by the specially designed microprocessor with proprietary algorithm.

Multi-phasic DC motors are not described in prior art DC motors.

SUMMARY OF THE INVENTION

The subject invention describes a highly efficient pancake shaped multi-phasic DC motor with dual flywheel rotors that operates with generator characteristics that simultaneously captures and stores inductive kickback and back emf, in addition to collecting generated power (regenerative braking, etc). RPM, torque, regenerative braking, inductive kickback and back emf are all variable and controlled by a microprocessor and algorithm. Batteries and capacitor banks are used as a rechargeable power pack.

At 100 RPM to 3,000 RPM, this high efficiency DC motor with generator and flywheel characteristics has an efficiency of about 80% to 95%.

The prototype is about 14 inches in diameter by 3 inches in height with twelve permanent magnets mounted in the periphery of two outer rotor disks and fifteen air core coils in the periphery of an inner stator disk. The magnets are mounted with north and south poles reversed for every other magnet. The air core coils are activated in equilateral positioned groups of three, while pairs of magnets in the outer rotors rotate past the coils. The flywheel rotors operate together as a single parallel unit secured to the central shaft with the stator fixed and sandwiched between the two rotors.

The high efficiency multi-phasic DC motor, using power from the power pack, is controlled by the specially designed microprocessor, which sequentially pulses the coils in equilateral groups. The dual flywheel rotors develop and store sufficient kinetic energy to provide a smooth output without any torque ripple.

With the designed imbalance of 12 magnets and 15 air core coils, some coils are being energized during their motor phase, while simultaneously inductive kickback and back emf are conserved through the intelligent control of the power pack, in addition to which, generated power such as regenerative braking, inductive kickback and emf are intelligently collected and stored in the power pack at their times of induction. This designed numerical imbalance of 12 magnets and 15 coils insures that adjoining magnets are at different degrees of distance from the coils ahead and the coils behind, and also insures that all magnets do not pass over coils simultaneously.

Full wave bridge rectifiers and power switching electronics assist in collecting generated power, such as regenerative braking power, back emf and inductive kickback, which are intelligently stored in the power pack for future use.

High efficiency in the DC motor is achieved by the imbalance in the number of permanent magnets 12 (pairs) and air core coils 15; the control of the pulling and pushing (attraction and repulsion) of the magnets; the simultaneous conservation of energy by collecting generative power such as inductive kickback and back emf; the multiphasic operation; the dual flywheel rotors, the power pack and the intelligent control provided by the specially designed microprocessor and proprietary algorithm.

BRIEF DESCRIPTION OF THE DRAWINGS

FIG. 2 shows a plan view of the positions of twelve magnets, relative to fifteen coils during a period of revolution of the rotors containing the magnets.

FIG. 3 shows a conceptual cut-away view of the stator and the dual flywheel rotors, with the relative positions of the coils and magnets, plus a sectional view of the stator and the dual rotors.

DETAILED DESCRIPTION OF THE PREFERRED EMBODIMENTS

Figure 1:
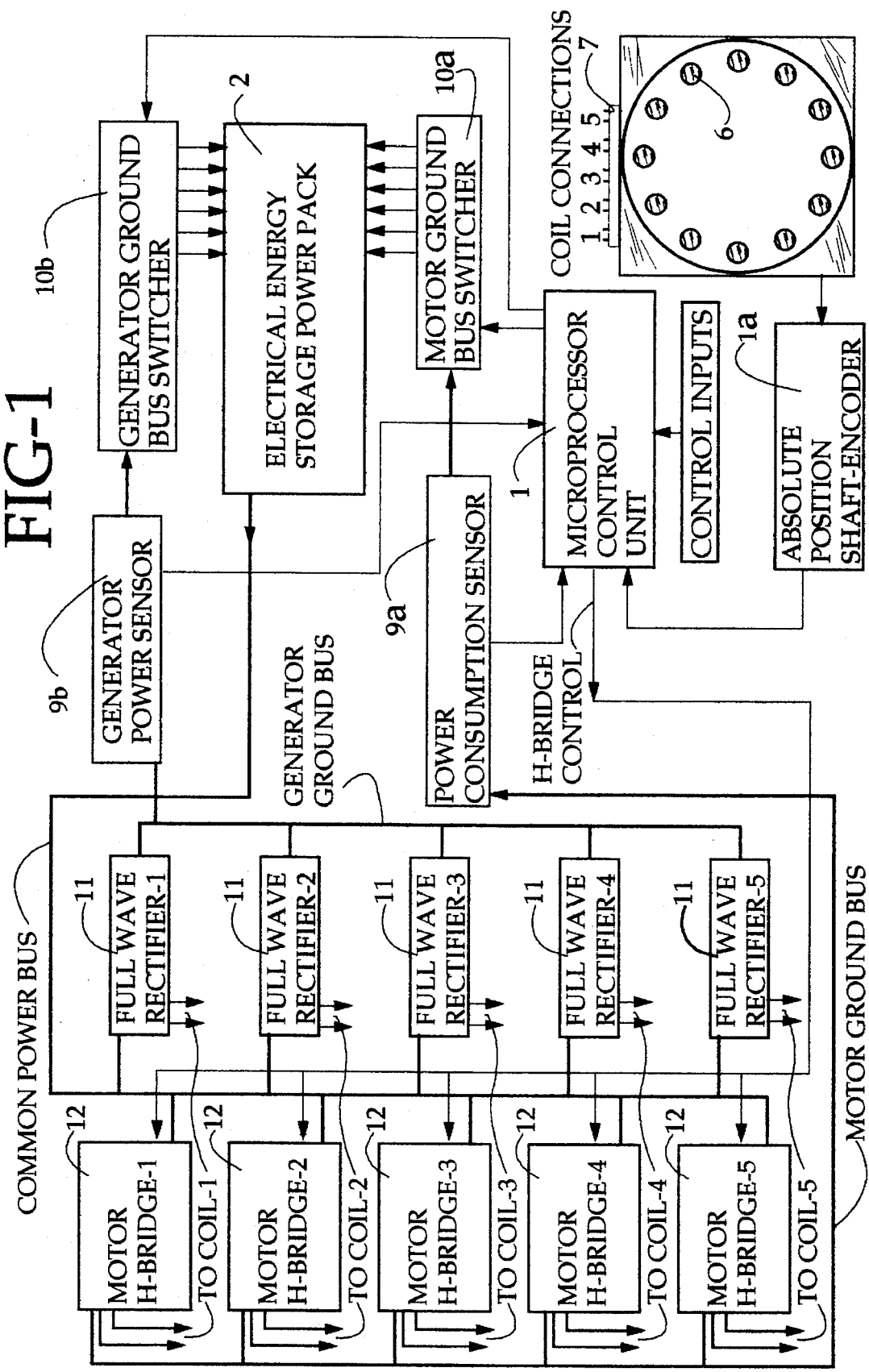
FIG. 1 shows a schematic and block diagram of the power electronics, rectifiers, H-bridges, coil connections microprocessor.

Referring to FIG. 1, the high efficiency multi-phasic DC motor is a pancake shaped high efficiency DC motor with dual flywheel rotors that operates with generator characteristics that simultaneously captures and stores inductive kickback and back emf, in addition to collecting generated power (regenerative braking, etc). RPM and torque are both variable and controlled by the microprocessor 1. The high efficiency DC motor uses a power pack 2 as a rechargeable power source, which is composed of a capacitor bank and batteries. At normal operating speeds of about 100 RPM to 3,000 RPM the motor has an efficiency of about 80% to 95%.

Referring to FIG. 2 and 3, the preferred embodiment of the high efficiency DC motor is composed of one stator 4, containing the coils, that is fixed to a stationary housing; sandwiched between dual disk shaped flywheel rotors 3, containing the magnets, that are mounted on a central shaft 5 and operate together as single parallel unit.

The high efficiency DC motor, in its preferred embodiment, has twelve pairs of one inch diameter by three-quarters inch high magnets 6, mounted equidistant apart in the periphery of the two rotors, with north and south poles reversed for every other magnet. There are fifteen coils 7, with 1 inch diameter air cores 8, also mounted equidistant apart in the periphery of the stator. The difference in the number of magnets and coils provides a designed imbalance so that adjoining magnets are positioned at different degrees of distance from coils ahead and coils behind and insuring that all magnets do not pass over coils simultaneously.

In the preferred embodiment of the high efficiency DC motor, permanent magnets 6 are made of neodymium (NdFeB) and the air core coils 7 are wound with wire of high conductivity. When a north pole is induced in an air core coil 7, it will efficiently repel the north pole of the neodymium magnet 6 as the magnet passes over the energized air core coil 7. However, if the coil contained an iron core and was energized with same amount of power as used to energize an air core coil 7, the north pole of a neodymium magnet 6 will attract the iron core of the coil, even though it has an induced north pole. Only by increasing the power to the iron cored coil will the neodymium magnet be repulsed. This is an inefficient use of power.

The high efficiency multi-phasic DC motor also has certain generator characteristics. It induces, captures and stores inductive kickback and back emf, as well as collecting generated power such as regenerative braking. During any degree of rotation of the rotors, a group of magnets 6 is approaching or departing de-energized coils 7. This induces electron flow in the de-energized coils 7, generating electric power at a lower power level than the energized coils 7 operating in a motor phase, providing controlled regeneration and storage of back emf and inductive kickback at their respective times of induction.

Referring again to FIG. 1, the operation of the high efficiency multi-phasic DC motor is controlled by a specially designed microprocessor 1, an absolute position encoder 1a, sensors 9a and 9b and power electronics 10a and 10b in a manner well known to those skilled in the art. The coils 7 are sequentially energized or pulsed, through the motor H-bridges, by the microprocessor 1 in the proper order and polarity. Generated power and inductive kickback are collected by full wave bridge rectifiers 11 plus power electronics and stored in the power pack 2. This power is later fed sequentially through H-bridges 12 into air core coils 7, being energized for their motor phase.

The motor is also designed to utilize a dual flywheel rotor that will develop and store enough kinetic energy to provide high torque output and inertia to sustain, smooth out and hold the RPM developed by the rotors. The flywheel design of the disk shaped rotors plus the weight of the magnets 6 in the periphery of the rotors provides adequate mass to store kinetic energy.

This invention has been described in terms of a preferred embodiment. However, those skilled in the art know that it is possible to make many changes and that other embodiments are possible without departing from the spirit of the high efficiency multiphasic DC motor invention and its various designs. For example:

1. With design changes in the magnets, coils, microprocessor, power pack and DC motor dimensions, speeds of 25,000 RPM and much higher are possible.

2. The high efficiency DC motor will also operate using a single rotor sandwiched between two stators.

3. Additional high efficiency DC motor modules (one stator and dual rotor per module) or stages (one rotor and one stator per stage) may be added to increase electrical power and kinetic energy.

4. Electromagnetic coils can be used instead of permanent magnets.

5. The dimensions, weight and shape of the high efficiency DC motors, its magnets and its coils are all variable. They can vary from inches to many feet and from ounces to hundreds of pounds and they can be used in a variety of shapes.

6. The high efficiency DC motors will operate if the north and south poles of the permanent magnets are not aligned in the same polarity or if the polarity is not reversed for every other magnet.

7. The number of magnets and coils used can be reversed, increased, decreased or varied, depending on design requirements.

8. The magnets can be made of iron, conductive materials or super conductive materials, when available, as can the coils. The coils can be wire wound, ribbon wound or solid state. Rectifying devices other then full wave bridge rectifiers can also be utilized.

9. Additional magnets can also be mounted on the radii of the 12 magnets in the periphery of the rotors, and more coils can be added on the radii of the 15 coils in the periphery of the stator. This will increase both the kinetic energy and the electromagnetic power of the high efficiency DC motor.

10. With all the magnets of the radii coupled together with iron or other amorphous metals, both the electric power and kinetic energy of the high efficiency DC motor will increase markedly.

11. The high efficiency DC motor will also operate with other groupings of magnets and coils, such as 1, 2, 5, etc.

12. The high efficiency DC motor system can utilize advanced chip designs that are not currently available; can use miniaturized and/or combined electronic components; and can use remote control, while retaining the basis of a highly coordinated DC motor system.

13. When capacitors with battery characteristics and/or batteries with capacitor characteristics become available; the power pack may then be modified to utilize these devices. For example, there are 5000 volt 70 farad capacitors currently in the development stage that may be utilized by the HEFO power pack when available.

We claim:

1. A high efficiency, high torque multiphase direct current machine which operates simultaneously in a motor-mode, in a generator-mode, and in a flywheel-mode comprising:

an inner stator disk, with one or more air core coils mounted equidistant apart in a periphery of said stator disk and positioned so that said air core coils are energized in equilaterally balanced groups;

a pair of outer rotor disks disposed parallel to and aligned with one another;

said stator disk and said rotor disks being made of strong lightweight plastic structural materials;

a fixed central shaft coupled to said rotor disks and passing through said stator disk, where said shaft is sandwiched in a fixed position between said rotor disks;

a plurality of permanent magnets arranged in two paired sets, said magnets of each one set are mounted equidistant apart in a periphery of each one rotor disk, with each pair in polar alignment and poles of each pair reversed in every other pair;

a generated current sensor and a generated voltage sensor for use in generator-mode;

a current consumption sensor and a voltage consumption sensor for use in motor-mode;

a rotor position sensor;

a switching means for controlling power to said coils;

a feedback controlled rectifying means to recover and control generated energy;

a rechargeable power pack including electronically controlled rectifying devices, driver electronics, a capacitor bank, and rechargeable batteries, where said machine concomitantly in generator-mode utilizes inductive kickback, back-emf, and regenerative braking to recharge said power pack; and, a microprocessor controlling electronic commutation and operation of said machine by utilizing data derived from said sensors.

2. The multiphase machine as claimed in claim 1, wherein said machine includes one or more phases, and wherein some of said one or more phases are selected to operate in said motor-mode while simultaneously the other of said one or more phases are selected to operate in said generator-mode, and said permanent magnets in said rotor disk periphery combine to produce a flywheel rotor mass which provides kinetic energy to said machine in said flywheel-mode.

3. The multiphase machine as claimed in claim 2, wherein said one or more phases of said machine comprises five separate phases incorporated into five groups of three said air core coils each, for a total of fifteen coils, where said total of fifteen coils are mounted equidistant apart on said periphery of said stator disk in five equilaterally positioned groups of three.

4. The multiphase machine as claimed in claim 1, wherein said air core coils include cores with no magnetic material contained therein, and said cores produce little or no hysterysis or eddy currents.

5. The multiphase machine as claimed in claim 1, wherein said plurality of permanent magnets in said rotor disks comprises twenty-four neodymium magnets in twelve pairs, where said twelve pairs are mounted in polar alignment and equidistant apart in said peripheries of said rotor disks with north and south poles reversed in every other pair.

* * * * *